(12) United States Patent
Zoon

(10) Patent No.: US 11,731,519 B2
(45) Date of Patent: Aug. 22, 2023

(54) ELECTRICAL VEHICLE CHARGING SYSTEM FOR CHARGING AN ELECTRICAL VEHICLE

(71) Applicant: ABB Schweiz AG, Baden (CH)

(72) Inventor: Wiebe Zoon, Delft (NL)

(73) Assignee: ABB Schweiz AG, Baden (CH)

( * ) Notice: Subject to any disclaimer, the term of this patent is extended or adjusted under 35 U.S.C. 154(b) by 778 days.

(21) Appl. No.: 15/950,465

(22) Filed: Apr. 11, 2018

(65) Prior Publication Data

US 2018/0290555 A1     Oct. 11, 2018

(30) Foreign Application Priority Data

Apr. 11, 2017   (EP) .................................. 17165942

(51) Int. Cl.
*B60L 53/10* (2019.01)
*B60L 53/14* (2019.01)
(Continued)

(52) U.S. Cl.
CPC ............... *B60L 53/11* (2019.02); *B60L 53/14* (2019.02); *B60L 53/31* (2019.02); *H02J 7/007* (2013.01);
(Continued)

(58) Field of Classification Search
CPC .......... B60L 53/11; B60L 53/14; B60L 53/31; B60L 53/20; B60L 2270/142; B60L 2210/30; Y02T 10/70; Y02T 10/7072; Y02T 90/12; Y02T 90/14; H02J 7/042; H02J 7/0027; H02J 7/007; H02J 7/02; H05K 7/2089; H05K 7/20909

See application file for complete search history.

(56) References Cited

U.S. PATENT DOCUMENTS

2007/0027580 A1* 2/2007 Ligtenberg ............. G05D 23/19
                                                     700/300
2007/0153560 A1* 7/2007 Zhang ....................... H02J 7/02
                                                     363/166
(Continued)

FOREIGN PATENT DOCUMENTS

CN         102906959 A      1/2013
CN         103921739 A      7/2014
(Continued)

OTHER PUBLICATIONS

European Patent Office, Extended Search Report issued in corresponding Application No. 17165942.8, dated Oct. 19, 2017, 6 pp.
(Continued)

*Primary Examiner* — David V Henze-Gongola
(74) *Attorney, Agent, or Firm* — Greenberg Traurig, LLP

(57) ABSTRACT

The application relates to an electrical vehicle charging system for charging an electrical vehicle with a DC current, including a charger, an air conditioning device and a control device, whereby the charger is configured for delivering the DC current to the electrical vehicle, the air conditioning device is configured for heating and/or cooling the charging system, the air conditioning device and/or the charger emits a noise, and the control device is configured for controlling delivery of the DC current according to the noise.

20 Claims, 1 Drawing Sheet

(51) Int. Cl.
  *B60L 53/31*  (2019.01)
  *H02J 7/00*  (2006.01)
  *B60L 53/20*  (2019.01)

(52) U.S. Cl.
  CPC ........... *B60L 53/20* (2019.02); *B60L 2210/30* (2013.01); *B60L 2270/142* (2013.01); *H02J 2310/40* (2020.01); *H02J 2310/48* (2020.01); *Y02T 10/70* (2013.01)

(56) References Cited

U.S. PATENT DOCUMENTS

| | | |
|---|---|---|
| 2009/0021221 A1 | 1/2009 | Krauer et al. |
| 2012/0229086 A1 | 9/2012 | Chi et al. |
| 2013/0069592 A1* | 3/2013 | Bou ................. B60L 53/20 320/109 |
| 2016/0368391 A1 | 12/2016 | Kojima |
| 2017/0240058 A1* | 8/2017 | Ghebru ................. B60L 58/26 |

FOREIGN PATENT DOCUMENTS

| | | |
|---|---|---|
| CN | 105492239 A | 4/2016 |
| CN | 106300531 A | 1/2017 |
| DE | 102011079415 A1 | 1/2013 |
| DE | 102013020774 A1 | 8/2014 |
| DE | 102016202807 A1 | 8/2017 |
| EP | 2572431 A2 | 3/2013 |
| EP | 2784899 A1 | 10/2014 |
| WO | 2011145939 A2 | 11/2011 |

OTHER PUBLICATIONS

China Second Office Action, issued by the Chinese Patent Office, regarding corresponding patent application Serial No. 201810319930.1, dated Aug. 30, 2021; 11 pages (with English Summary Translation).

India Office Action, issued by the Intellectual Property India Office, regarding corresponding patent application Serial No. IN201844013382; dated Dec. 27, 2019; 6 pages.

* cited by examiner

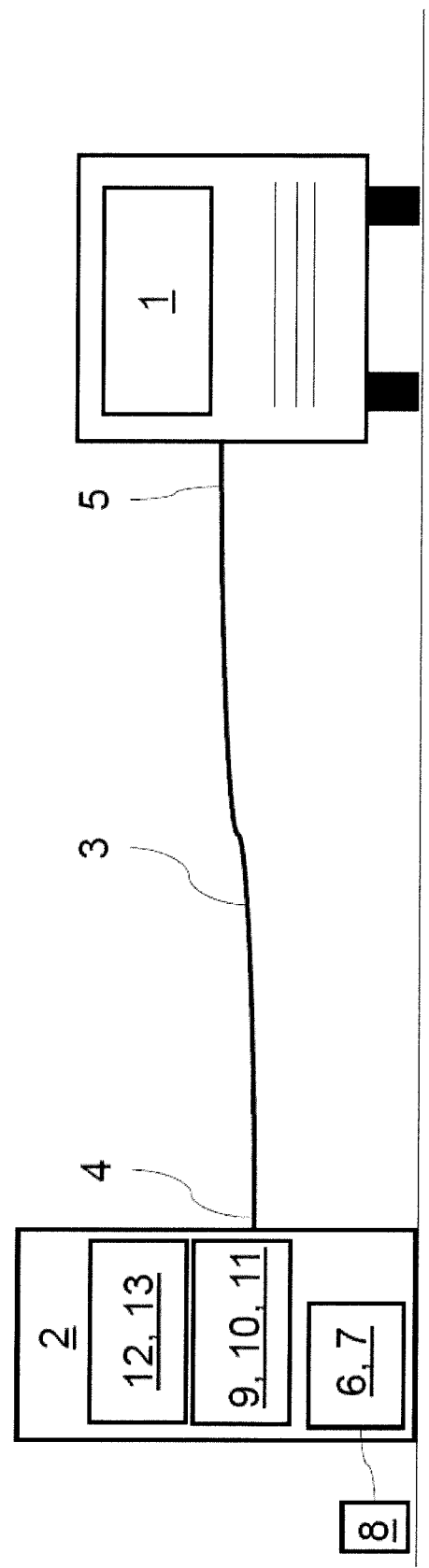

ELECTRICAL VEHICLE CHARGING SYSTEM FOR CHARGING AN ELECTRICAL VEHICLE

TECHNICAL FIELD

The invention relates to an electrical vehicle charging system for charging an electrical vehicle with a DC current, comprising a charger, an air conditioning device and a control device, whereby the charger is configured for delivering the DC current to the electrical vehicle and the air conditioning device is configured for heating and/or cooling the charging system.

BACKGROUND ART

Electrical charging system for providing DC energy to charge a battery of an electrical vehicle are known from prior art. Such charging system usually comprises a charger connected on an AC side to a power source such an AC grid and has a DC side for delivering the DC current to the electrical vehicle. The charging system often includes a power transformer and/or a converter for converting AC energy received from the AC grid towards the required DC current.

The DC side may comprise one or more charging ports each comprising an interface for energy exchange between the charger and the electrical vehicle via a DC charging cable. The charging ports are usually provided as normed socket-outlets or comprise a respective DC charging cable with a connector adapted for connecting the electrical vehicle. The charger is often configured according to norm IEC 62196.

Electrical vehicle charging system are usually characterized by emitting a noise, for example resulting from a fan of an air conditioning device installed in the charging system for cooling and/or heating electrical components of the electrical vehicle charging system, such as the before mentioned charger, converter, transformer, computerized means for controlling said electrical components and the like. Besides that the electrical components itself often emit a noise, for example resulting from magnetostriction of the transformer or from the converter.

As the number of electrical vehicles steady grows, more and more electrical vehicle charging systems are installed not only at filing stations or public parking spaces but also in domestic settings. However, in particular at domestic settings such noises can be very annoying and disturbing and may thus prohibit more installations of electrical vehicle charging systems.

A charging system for electric vehicles in for example known from WO 2011/145939 A2.

SUMMARY OF INVENTION

It is therefore an object of the invention to provide an electrical vehicle charging system characterized by an undisturbing noise emission.

The object of the invention is solved by the features of the independent claims. Preferred embodiments are detailed in the dependent claims.

Thus, the object is solved by an electrical vehicle charging system for charging an electrical vehicle with a DC current, comprising a charger, an air conditioning device and a control device, whereby the charger is configured for delivering the DC current to the electrical vehicle, the air conditioning device is configured for heating and/or cooling the charging system, the air conditioning device and/or the charger emits a noise, and the control device is configured for controlling delivery of the DC current according to the noise.

Therefore it is a key point of the invention that the charging is controlled based on the noise emitted by the charging system, for example by the air conditioning device due to cooling and/or heating the charging system or from other electrical components of the charging system emitting a noise, for example resulting from magnetostriction of a transformer or a converter. It becomes thus possible to install the charging system in domestic settings which are noise averse.

Controlling delivery of the DC current means that the level of DC current provided to the electrical vehicle is controlled depending on the emitted noise. Thus, charging of the electrical vehicle respectively a charging level is dependent on the emitted noise. For example, if in a domestic setting only a certain noise level is acceptable then a charging duration is dependent on said noise level influencing the level of DC current provided to the electrical vehicle. During charging, the noise level may me proportional or in relation to the level of provided DC current. Controlling delivery of the DC current is preferably done such that a stable operation of the charging system is maintained i.e. that electrical components of the charging system such as the charger, a converter and/or a transformer do not overheat.

The charger is preferably provided in accordance with IEC 62196 norm, for example incorporating norms SAE J1772, VDE-AR-E2623-2-2, EV Plug Alliance Proposal, and/or JEVS G105-1993 for delivering the DC current to the electrical vehicle. The air conditioning device can be provided as any air conditioning means known from prior art and is preferably configured for maintaining a stable operating temperature of the charging system. Thus, during winter times the air conditioning device may heat the charging system and during summer times the air conditioning device may cool the charging system. The electrical vehicle can be provided as any electrical vehicle known from prior art, for example as an electrical bus, ebus and/or comprises a battery to be charged when connecting to the charger. The control device is preferably provided as a programmable logic array, as a programmable logic controller and/or as a computerized means and may comprise a network connection for allowing a distant programming of the control device.

It is further preferred that the controlling device is configured for limiting delivery of the DC current such that the noise does not exceed a predefined limit. In particular, the air conditioning device emits the noise during cooling and/or heating the charging system and/or the charger emits the noise during charging the electrical vehicle. The emitted noise can be determined as sound intensity in dB, for example measured in one meter distance to the charging system. The predefined limit may be defined by an operator configuring the charging system, either local at the charging system or distant via a network. The predefined limit may further depend on a geographical location where the charging system is installed and thus may be lower in domestic settings compared to non-domestic settings.

In a further preferred implementation the air conditioning device and/or the charger comprises a fan emitting the noise and the controlling device is configured for controlling delivery of the DC current based on a number of revolutions of the fan. Normally, the speed of the fan of an air conditioning device is controlled based on the temperature of the electrical components. According to this implementation the speed of the fan is controlled based on the emitted noise. Thus, in case the air conditioning device cools the electrical components of the charging system, in order to avoid overheating of the charging system, if a ventilation speed is decreased by the control device in order not to exceed the predefined voice level then consequently the level of DC current is decreased by the control device, preferably in an analogue manner.

Generally, design of the charger is always a compromise between production cost, size, noise level and electrical performance. Production cost and size are obviously fixed values, but noise level and electrical performance can be modified during use. By decreasing the maximum DC output current, thermal losses of the charging system are reduced. In that case, the fan respectively a blower or exhauster can be operated at a lower speed, without overheating electrical components of the charging system. As the fan is usually the largest source of noise in the charging system, noise levels are reduced proportionally.

It is further preferred that the control device is configured for controlling delivery of the DC current according to a predefined time or according to a predefined time until the electrical vehicle has to be charged by a predefined level. For example, a user of the charging system could indicate that between 08:00 pm and 8:00 am the fan of the air conditioning device should spin at no more than 30% of the maximum speed, unless the electrical vehicle is not fully charged by 7:30 am. The charger starts charging at reduced DC current when the electrical components reach a maximum acceptable temperature. If the charger predicts that the electrical vehicle will not be fully charged by 7:30 am unless the ventilation is increased, it will increase the ventilation level by the minimum required amount that it will take to finish charging at 7:30 am.

In a further preferred implementation the control device is configured for limiting delivery of the DC current such that the noise does not exceed a first predefined limit during a first time span and does not exceed a second predefined limit during a second time span. The first time span could be night time requiring a lower noise level, while the second time span could be day time, during which a neighbourhood may accept higher noise levels. For example, a network operator may allow to place the charging system in a residential area but permit only a certain noise level between 07:00 pm and 8:00 am. The maximum ventilation level of the air conditioning device during that time span level can be calculated from the certain noise level, and the fan power never is not set during that time span to anything higher than this setting. If the electrical components reach the maximum acceptable temperature, the output DC current of the charger is reduced. In this case the user may not be able to override the setting.

It is further preferred that the control device is configured for limiting the noise to ≤40 dB. Preferably, the control device is configured for limiting the noise to ≤30, ≤20 or ≤10 dB. Further preferably, the control device is configured for limiting the noise to a first noise level during the first time span, for example to not more than 40 dB during 08:00 pm and 8:00 am i.e. at night time, and to a second noise level during the second time span, for example to not more than 60 dB during 08:00 am and 08:00 pm. Often, charging time is not very critical during the night most of the time. For public chargers, the noise level may be limited during certain hours due to regulations. In this case, the charging system can be installed at such location where lower noise levels must be guaranteed during these quieter hours.

In another preferred implementation controlling delivery of the DC current comprises reducing the DC current until the noise does not exceed the predefined limit. Such way output of the DC current might be proportional or nearly proportional to the noise level. It might be possible that a user of the electrical vehicle is able to override the predefined limit, for example, if he has an exception for charging the electrical vehicle at a higher noise level.

It is further preferred that the electrical vehicle charging system comprises a DC charging cable having a first end and a second end, whereby the first end is connected to the charger for receiving the DC voltage and the second end is configured for connecting the electrical vehicle. The second end is preferably equipped with a connector for connecting to a respective socket-outlet of the electrical vehicle. The connector and/or the socket-outlet is preferably provided as per JARI Level 3 DC norm or according to any of the other norms described before.

In a further preferred implementation the charger comprises a power transformer having a first side and a second side and a power converter having an AC side and a DC side, the primary side of the power transformer is configured for connecting to an AC grid, the secondary side of the power transformer is connected to the AC side of the power converter and the DC side of the power converter is configured for providing electrical energy to charge the electrical vehicle. The power converter preferably comprises a three-phase thyristor bridge rectifier or similar means known from prior art. Preferably, the charger provides DC power to a plurality of outlet ports arranged distant to the charger. A plurality of power converters can be connected in parallel for increasing electrical charging power. The power converter may convert up to 150 kW, 300 kW or 500 kW. The charger respectively each outlet port may be configured for conducting a DC voltage of 400 Volt and a DC current of 32 A, 63 A or 150 A. Besides that the charger or the outlet port can be configured to conduct higher voltages and amperes for allowing fast charging, for example 1000 V DC at 400 A or 150 kW, 300 kW or higher.

It is further preferred that the charger comprises a switchable connection matrix device comprising a number of outlet ports each configured for electrically connecting the electrical vehicle and the switchable connection matrix device is configured for connecting one or a plurality of power converters to the outlet port. The matrix preferably comprises a number of electronic switches configured for establishing the electrical connection between the outlet port and the respective power converter, for example IGBTs.

The object of the invention is further solved by a method for controlling a noise emission of a charger for an electrical vehicle, comprising the steps of delivering, by the charger, a DC current to charge the electrical vehicle, and air conditioning the charger, whereby air conditioning and/or delivering the DC current emits the noise, and controlling delivery of the DC current according to the noise.

In a further preferred implementation the method comprises the step of controlling delivery of the DC current such that the noise does not exceed a predefined limit.

It is further preferred that air conditioning the charger comprises ventilating the charger and/or an air conditioning device providing the air conditioning and comprising the step of controlling delivery of the DC current based on on a number of revolutions of a fan of the air conditioning device.

In another preferred implementation the method comprises the step of controlling delivery of the DC current according to a predefined time or according to a predefined time until the electrical vehicle has to be charged by a predefined level.

It is further preferred that controlling delivery of the DC current comprises limiting delivery of the DC current such that the noise does not exceed a first predefined limit during a first time span and not exceed a second predefined limit during a second time span.

In further preferred implementation controlling delivery of the DC current comprises limiting the noise to 40 dB and/or reducing the DC current until the noise does not exceed the predefined limit.

Further embodiments and advantages of the method are directly and unambiguously derived by the person skilled in the art from the system as described before.

BRIEF DESCRIPTION OF DRAWINGS

These and other aspects of the invention will be apparent from and elucidated with reference to the embodiments described hereinafter.

In the drawings:

FIG. 1 shows an electrical vehicle charging system for charging an electrical vehicle 1 according to a preferred embodiment of the invention in a schematic view.

DESCRIPTION OF EMBODIMENTS

FIG. 1 shows an electrical vehicle charging system for charging an electrical vehicle 1 according to a preferred embodiment of the invention in a schematic view. The charging system comprises a charger 2 configured for delivering a DC current via a DC charging cable 3 to the electrical vehicle 1. Thereby, the DC charging cable 3 is firmly connected with its first end 4 to the charger 2 and with its second end 5 via a connector to the electrical vehicle 1. The connector is provided according to norm IEC 62196.

The charging system comprises a power transformer 6 and a power converter 7. The power transformer 6 is connected with its primary side to an AC grid 8 and with its secondary side to the power converter 7, which converts the received AC power into DC power for delivering the DC current for charging a battery of the electrical vehicle 1. The charger further comprises a switchable connection matrix device 12, which comprises a number of outlet ports 13 each configured for electrically connecting the electrical vehicle 1. The switchable connection matrix device 12 allows for connecting one or a plurality of power converters 7 to the respective outlet port 13.

The charging system further comprises an air conditioning device 9 for heating and/or cooling the charging system. The air conditioning device 9, the charger 2, the power transformer 6 and the power converter 7, in particular during heating, cooling respectively charging, emit a noise characterized by a noise level. The noise originates, among others, by a fan 10 of the air conditioning device 9 required for blowing hot respectively cool air for heating respectively cooling the charging system, or results from magnetostriction of the transformer or the converter.

Operation of the air conditioning device 9 is controlled by a computerized control device 11 such that delivery of the DC current happens according to the noise. Particularly, delivery of the DC current is limited by the control device 11 such that the emitted noise does not exceed a predefined limit of not more than 40 dB, measured at one meter distance to the charging system. Thus, in order not the exceed said limit, the ventilation speed is controlled by the control device 11 and depending on the ventilation speed delivery of the DC current is controlled i.e. increased or decreased. For example, if the control device 11 detects that the noise level is more than 40 dB, the control device 11 reduces ventilation speed and also reduces the level of DC current delivered to the electrical vehicle 1 such that the reduced ventilation speed suffices for cooling the charging system in order to ensure operational stability during charging.

It is possible that the control device 11 controls delivery of the DC current according to a predefined time. For example, the level of DC current can be higher during day time than at night time. Further, controlling the DC current can be depending on reaching a predefined charging level. For example, if the electrical vehicle 1 has to be fully charged by 08:00 am, while charging during 08:00 pm and 08:00 am can only be done at a reduced rate of 50%, then charging may start for example at 06:00 pm with 100% DC current and may continue between 08:00 pm and 08:00 am at 50% DC current.

This said, the control device 11 may control delivery of the DC current such that the noise does not exceed a first predefined limit during a first time span, for example during night times, and not exceed a second predefined limit during a second time span, for example during day times. Thus, the control device 11 controls speed of the fan 10 of the air conditioning device 9 accordingly. Practically, controlling delivery of the DC current means reducing the DC current until the noise does not exceed the predefined limit.

In sum, the charging system allows for various implementations. For example, being implemented as a home charger, a user of the charging system could indicate that between 08:00 pm and 8:00 am the fan 10 should spin at no more than 30% of the maximum ventilation speed, unless the electrical vehicle 1 is not fully charged by 7:30 am. The charger 2 starts charging at reduced power until electrical components of the charging system i.e. the charger 2, the power converter 7 or the power transformer 6 reach a maximum acceptable temperature. If the control device 11 predicts that the electrical vehicle 1 will not be fully charged by 7:30 am unless the ventilation is increased, the control device 11 will increase the ventilation level by the minimum required amount that charging will take to finish charging at 7:30 am.

In a further example, a network operator is allowed to place a charging system in a residential area, but the charging system limited to 40 dB noise between 07:00 pm and 8:00 am. The maximum fan 10 power level can be calculated from this noise level, and the fan 10 power is controlled by the control device 11 to never higher than this setting. If the electronic components reach the maximum acceptable temperature, the output power of the charger 2 is reduced. In this case the user is not able to override the setting, as the permit does not allow this. However, charging is still possible even in noise sensitive environments.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 1 electrical vehicle
2 charger
3 charging cable
4 first end
5 second end
6 power transformer
7 power converter
8 AC grid
9 air conditioning device
10 fan
11 control device
12 switchable connection matrix device
13 outlet port

The invention claimed is:

1. An electrical vehicle charging system for charging an electrical vehicle with a DC current, comprising:
a charger, the charger including:
an air conditioning device, and
a control device;
wherein the charger is external to the electrical vehicle and configured for delivering the DC current to the electrical vehicle;
wherein the air conditioning device is external to the electrical vehicle and configured for heating and/or cooling the charger; and
wherein the air conditioning device and/or the charger emits a noise;
wherein the control device is configured to calculate a power level of the air conditioning device based on the noise level and the control device limits a power provided to the air conditioning device based on the calculation and a predefined limit;
wherein the control device is external to the electrical vehicle and configured to control a delivery of the DC current output by the charger such that the charger does not overheat and to set a level of DC current provided by the charger to the electric vehicle in response to the noise.

2. The electrical vehicle charging system according to claim 1, wherein the control device is configured for limiting delivery of the DC current such that the noise does not exceed the predefined limit.

3. The electrical vehicle charging system according to claim 1, wherein the air conditioning device and/or the charger comprises a fan emitting the noise and the control device is configured for controlling delivery of the DC current based on a number of revolutions of the fan.

4. The electrical vehicle charging system according to claim 1, wherein the control device is configured for controlling delivery of the DC current according to a predefined time or according to a predefined time until the electrical vehicle has to be charged by a predefined level.

5. The electrical vehicle charging system according to claim 1, wherein the control device is configured for limiting delivery of the DC current such that the noise at the charger does not exceed a first predefined limit during a first time span and the noise at the charger does not exceed a second predefined limit during a second time span;
wherein the first time span and the second time span is during a single charging operation and wherein the first time span is different from the second time span.

6. The electrical vehicle charging system according to claim 1, wherein the control device is configured for limiting the noise to ≤40 dB.

7. The electrical vehicle charging system according to claim 1, wherein controlling delivery of the DC current output by the charger comprises reducing a level of the DC current output by the charger from a first DC current level to a second DC current level in response to a temperature of the charger reaching a maximum acceptable temperature;
wherein the charger outputs the second DC current to charge the electrical vehicle.

8. The electrical vehicle charging system according to claim 1, further comprising a DC charging cable having a first end and a second end, wherein the first end is connected to the charger for receiving DC voltage and the second end is configured for connecting the electrical vehicle.

9. The electrical vehicle charging system according to claim 1, wherein the charger comprises a power transformer having a first side and a second side and a power converter having an AC side and a DC side, the first side of the power transformer is configured for connecting to an AC grid, the second side of the power transformer is connected to the AC side of the power converter and the DC side of the power converter is configured for providing electrical energy to charge the electrical vehicle.

10. The electrical vehicle charging system according to claim 1, wherein the charger comprises a switchable connection matrix device comprising a number of outlet ports each configured for electrically connecting the electrical vehicle and the switchable connection matrix device is configured for connecting one or a plurality of power converters to each of the number of outlet ports.

11. A method for controlling a noise emission of a charger for an electric vehicle, the charger including an air conditioning device, and a control device, the method comprising:
delivering, by the charger, a DC current to charge the electrical vehicle, wherein the charger is external to the electrical vehicle;
air conditioning the charger, wherein air conditioning and/or delivering the DC current emits a noise;
calculating, by the charger, a power level of the air conditioning device based on the noise level;
providing power to the air conditioning device based on the calculation and a predefined limit;
controlling a delivery of the DC current such that the charger does not overheat; and
controlling a magnitude of the DC current provided by the charger to the electric vehicle based on a detected level of the noise;
wherein the air conditioning device and the control device are disposed external to the electrical vehicle.

12. The method according to claim 11, further comprising controlling delivery of the DC current such that the noise does not exceed the predefined limit.

13. The method according to claim 11, wherein air conditioning the charger comprises ventilating the charger and/or comprising an air conditioning device providing the air conditioning and further comprising controlling delivery of the DC current based on a number of revolutions of a fan of the air conditioning device.

14. The method according to claim 11, further controlling delivery of the DC current according to a predefined time or according to a predefined time until the electrical vehicle has to be charged by a predefined level.

15. The method according to claim 11, wherein controlling delivery of the DC current comprises limiting delivery of the DC current such that the noise does not exceed a first predefined limit during a first time span and not exceed a second predefined limit during a second time span.

16. The method according to claim 11, wherein controlling delivery of the DC current comprises limiting the noise to ≤40 dB and/or reducing the DC current until the noise does not exceed the predefined limit.

17. The electrical vehicle charging system according to claim 2, wherein the air conditioning device and/or the charger comprises a fan emitting the noise and the control device is configured for controlling delivery of the DC current based on a number of revolutions of the fan.

18. The electrical vehicle charging system according to claim 2, wherein the control device is configured for controlling delivery of the DC current according to a predefined time or according to a predefined time until the electrical vehicle has to be charged by a predefined level.

19. The electrical vehicle charging system according to claim 2, wherein the control device is configured for limiting delivery of the DC current such that the noise emitted by the charger does not exceed a first predefined limit during a first time span and not exceed a second predefined limit during a second time span.

20. The method according to claim 12, wherein air conditioning the charger comprises ventilating the charger and/or comprising an air conditioning device providing the air conditioning and further comprising controlling delivery of the DC current based on a number of revolutions of a fan of the air conditioning device.

* * * * *